US009804655B2

(12) United States Patent
Sugiyama et al.

(10) Patent No.: US 9,804,655 B2
(45) Date of Patent: Oct. 31, 2017

(54) APPARATUS CONTROL SYSTEM, MOBILE TERMINAL AND PROGRAM (75) Inventors: Takeshi Sugiyama, Hyogo (JP); Hiroki Kazuno, Osaka (JP); Toshiaki Nakao, Osaka (JP); Yoshifumi Murakami, Osaka (JP); Toru Shimotsuma, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 232 days.

(21) Appl. No.: 14/115,199

(22) PCT Filed: May 21, 2012

(86) PCT No.: PCT/JP2012/062920
§ 371 (c)(1),
(2), (4) Date: Nov. 1, 2013

(87) PCT Pub. No.: WO2012/161156
PCT Pub. Date: Nov. 29, 2012

(65) Prior Publication Data
US 2014/0088775 A1 Mar. 27, 2014

(30) Foreign Application Priority Data
May 24, 2011 (JP) ................ 2011-115961

(51) Int. Cl.
*G05D 3/12* (2006.01)
*G05D 5/00* (2006.01)
(Continued)

(52) U.S. Cl.
CPC ........... *G06F 1/3203* (2013.01); *G08C 17/02* (2013.01); *G08C 2201/93* (2013.01)

(58) Field of Classification Search
None
See application file for complete search history.

(56) References Cited

U.S. PATENT DOCUMENTS

| 4,808,841 A | * | 2/1989 | Ito ..................... G05B 19/0426 307/11 |
| 6,133,847 A | * | 10/2000 | Yang .................. G05B 19/0426 340/12.25 |

(Continued)

FOREIGN PATENT DOCUMENTS

| CN | 1889036 A | 1/2007 |
| CN | 101436972 A | 5/2009 |

(Continued)

OTHER PUBLICATIONS

International Search Report for corresponding International Application No. PCT/JP2012/062920 dated Jun. 19, 2012.
(Continued)

*Primary Examiner* — Mohammad Ali
*Assistant Examiner* — Md Azad
(74) *Attorney, Agent, or Firm* — Renner, Otto, Boisselle & Sklar, LLP (57) ABSTRACT

Apparatus control system includes control device controlling operation of apparatuses and portable mobile terminal communicable with the control device. In the control device, control unit controls each apparatus in accordance with control schedule stored in device-side storage unit and control request from the mobile terminal. In the mobile terminal, date and time setting unit sets arbitrary date and time as set date and time. Terminal-side storage unit stores terminal-side schedule in which control contents are associated with control dates and times for each apparatus. Simulation unit simulates operating state of each apparatus assuming that the apparatus is operating at the set date and time set by the date and time setting unit, using the terminal-side schedule. Apparatus state reflection unit outputs control request to the control device to cause the control device to control each apparatus such that the apparatus is in the operating state simulated by the simulation unit.

14 Claims, 5 Drawing Sheets

(51) Int. Cl.
*G05D 9/00* (2006.01)
*G05D 11/00* (2006.01)
*G05D 17/00* (2006.01)
*G06F 1/32* (2006.01)
*G08C 17/02* (2006.01)

(56) References Cited

U.S. PATENT DOCUMENTS

| | | | | |
|---|---|---|---|---|
| 7,139,562 B2* | 11/2006 | Matsui | ............... | G08C 17/02 340/426.13 |
| 7,865,568 B1* | 1/2011 | Redi | ............... | G08C 17/02 709/217 |
| 2009/0063678 A1* | 3/2009 | Maegawa | ............... | G06Q 10/06 709/224 |
| 2009/0096658 A1* | 4/2009 | Niwamoto | ............... | G08C 17/02 341/176 |
| 2011/0061078 A1* | 3/2011 | Rothschild | ............... | G11B 27/11 725/51 |

FOREIGN PATENT DOCUMENTS

| | | |
|---|---|---|
| JP | 2000-194887 A | 7/2000 |
| JP | 2001-295700 A | 10/2001 |
| JP | 2002-023845 A | 1/2002 |
| JP | 2003-228416 A | 8/2003 |
| JP | 2003-303228 A | 10/2003 |
| JP | 2005-293169 A | 10/2005 |
| JP | 2008-258978 A | 10/2008 |
| JP | 2009-256938 A | 11/2009 |
| JP | 2010-112584 A | 5/2010 |
| JP | 2010-165331 A | 7/2010 |
| JP | 2010-236847 A | 10/2010 |

OTHER PUBLICATIONS

Written Opinion for corresponding International Application No. PCT/JP2012/062920, dated Jun. 19, 2012.

English translation of Chinese Office Action dated Feb. 14, 2016 for corresponding Chinese Application No. 201280023528.X.

English translation of Second Chinese Office Action and Search Report dated Oct. 9, 2016 for corresponding Chinese Application No. 201280023528.X.

\* cited by examiner

| Control Point Name | State |
|---|---|
| Office Lighting | ● |
| Checkout Counter Lighting_1 | ● |
| Checkout Counter Lighting_2 | ◐ |
| ... | |
| Meat Counter Lighting_2 | ● |

APPARATUS CONTROL SYSTEM, MOBILE TERMINAL AND PROGRAM

TECHNICAL FIELD

This invention relates to an apparatus control system that controls a plurality of apparatuses, a mobile terminal that is communicable with a control device configured to control a plurality of apparatuses, and a program used by a computer that is communicable with the control device configured to control a plurality of apparatuses.

BACKGROUND ART

In recent years, social demand for energy savings has been increasing due to increase in global warming. For example, the Energy Conservation Act in Japan requires that the private sector not only improve the performance of individual apparatuses, but also achieve energy savings from a management perspective such as by using a BEMS (Building Energy Management System). As an energy-saving method from a management perspective, improving an operation schedule that associates control contents of an apparatus with control dates and times is known.

JP 2003-303228A (hereinafter referred to as Patent Document 1) discloses a facility apparatus management system that controls and monitors a plurality of facility apparatuses. The facility apparatus management system described in Patent Document 1 includes: a station that controls and monitors each of the facility apparatuses; and an information terminal that is connected to the station. With the facility apparatus management system described in Patent Document 1, the station notifies the monitoring/control result of each of the facility apparatuses to the information terminal, and the information terminal displays the monitoring/control result of each of the facility apparatuses. Moreover, the information terminal described in Patent Document 1 has a function for displaying an operation schedule of each of the facility apparatuses.

Incidentally, when analyzing an energy saving effect of previous apparatus control, it needs to be confirmed whether control in accordance with an operation schedule (hereinafter referred to as "scheduled control") was appropriate or not. When performing such confirmation, the operating state according to the scheduled control is required to be reproduced.

However, with the conventional facility apparatus management system described in Patent Document 1, there is a problem in that in order to reproduce the operating state according to the scheduled control, the date and time used for the entire system needs to be changed, which is troublesome and time-consuming. The above problem becomes more prominent with an increase of the number of operating states to be reproduced.

SUMMARY OF INVENTION

The present invention has been made in view of the above-described problems, and an object of the present invention is to provide an apparatus control system, a mobile terminal, and a program that enable operating states in accordance with scheduled control to be easily confirmed on site.

An apparatus control system of a 1st configuration according to the present invention is an apparatus control system for controlling a plurality of apparatuses. The apparatus control system includes a control device configured to control operation of each of the plurality of apparatuses by communication and a portable mobile terminal configured to communicate with the control device. The control device includes: a device-side storage unit configured to store a control schedule in which control contents are associated with control dates and times for each of the plurality of apparatuses; and a control unit configured to control the plurality of apparatuses in accordance with the control schedule and a control request from the mobile terminal. The mobile terminal includes: a terminal-side storage unit configured to store a terminal-side schedule in which control contents are associated with control dates and times for each of the plurality of apparatus; a date and time setting unit configured to set an arbitrary date and time as a set date and time; a simulation unit configured to simulate operating states of the plurality of apparatuses assuming that the plurality of apparatuses are operating at the set date and time set by the date and time setting unit by use of the terminal-side schedule; and an apparatus state reflection unit configured to output to the control device a control request to cause the control device to control the plurality of apparatuses such that the plurality of apparatuses are operated in the operating states simulated by the simulation unit.

With an apparatus control system of a 2nd configuration according to the present invention, the plurality of apparatuses are located in a predetermined area, in the apparatus control system according to the 1st configuration.

With an apparatus control system of a 3rd configuration according to the present invention, the control device includes a scheduled control suppression unit configured to disable the control in accordance with the control schedule by the control unit, when a control request is output from the apparatus state reflection unit to the control device, in the apparatus control system according to the 1st or 2nd configuration.

With an apparatus control system of a 4th configuration according to the present invention, the mobile terminal includes an input unit configured to receive input of change information by a GUI, the change information being information for changing the terminal-side schedule, and a schedule editing unit configured to edit the terminal-side schedule using the change information input to the input unit, in the apparatus control system according to any of the 1st to 3rd configurations.

With an apparatus control system of a 5th configuration according to the present invention, the mobile terminal includes a display unit configured to display the operating state simulated by the simulation unit, for each of the plurality of apparatuses, in the form of an icon, in the apparatus control system according to the 4th configuration.

With an apparatus control system of a 6th configuration according to the present invention, the display unit is configured to display, for each of the plurality of apparatuses, the icon in a superimposed manner on a map on which a location of the apparatus is indicated, in the apparatus control system according to the 5th configuration.

With an apparatus control system of a 7th configuration according to the present invention, the mobile terminal is configured such that an icon displayed on the display unit is selected through the input unit and change information for the apparatus corresponding to the selected icon is input, and the schedule editing unit changes a control content of the terminal-side schedule for the apparatus corresponding to the icon selected with the input unit, in the apparatus control system according to the 5th or 6th configuration.

With an apparatus control system of an 8th configuration according to the present invention, the terminal-side storage unit stores the same control contents for at least two apparatuses among the plurality of apparatuses in the terminal-side schedule, with the at least two apparatuses set as grouped apparatuses, and the mobile terminal includes an informing unit configured to inform that the remainder of the grouped apparatuses will be affected, when an icon corresponding to any of apparatuses in the grouped apparatuses is selected with the input unit and a control content of the grouped apparatuses is to be deleted from the terminal-side schedule by the schedule editing unit, in the apparatus control system according to the 7th configuration.

With an apparatus control system of a 9th configuration according to the present invention, it is preferable that the terminal-side storage unit stores the same control contents for at least two apparatuses among the plurality of apparatuses in the terminal-side schedule, with the at least two apparatuses set as grouped apparatuses, and the schedule editing unit changes the terminal-side schedule such that the remainder of the grouped apparatuses will be set as new grouped apparatuses, when an icon corresponding to any of apparatuses in the grouped apparatuses is selected with the input unit and a control content of the apparatus corresponding to the icon is to be deleted from the terminal-side schedule, in the apparatus control system according to the 7th configuration.

With an apparatus control system of a 10th configuration according to the present invention, the schedule editing unit adds, when at least two of icons are selected with the input unit, the same control content for at least two apparatuses corresponding to the at least two icons selected with the input unit to the terminal-side schedule, in the apparatus control system according to the 7th configuration.

With an apparatus control system of a 11th configuration according to the present invention, the mobile terminal includes a terminal-side transmission control unit configured to transmit information of the terminal-side schedule to the control device, and the control device includes a schedule updating unit configured to change information of the control schedule to the information of the terminal-side schedule transmitted from the mobile terminal, in the apparatus control system according to any of the 1st to 10th configurations.

With an apparatus control system of a 12th configuration according to the present invention, the control device includes a device-side transmission control unit configured to transmit information of the control schedule to the mobile terminal, and the mobile terminal includes a schedule setting unit configured to set the information of the control schedule transmitted from the control device into the terminal-side schedule, in the apparatus control system according to any of the 1st to 11th configurations.

With an apparatus control system of a 13th configuration according to the present invention, the input unit is configured to be input operation information for changing the control schedule by the GUI, the mobile terminal includes a terminal-side transmission control unit configured to transmit information of the terminal-side schedule to the control device in response to an input through the input unit, and the control device includes a schedule updating unit configured to change information of the control schedule to the information of the terminal-side schedule transmitted from the mobile terminal, in the apparatus control system according to any of the 4th to 10th configurations.

A mobile terminal according to the present invention is a portable mobile terminal capable of communicating with a control device that controls operation of a plurality of apparatuses by communication in accordance with an external control request. The mobile terminal includes: a terminal-side storage unit configured to store a terminal-side schedule in which control contents are associated with control dates and times for each of the plurality of apparatuses; a date and time setting unit configured to set an arbitrary date and time as a set date and time; a simulation unit configured to simulate operating states of the plurality of apparatuses assuming that the plurality of apparatuses are operating at the set date and time set by the date and time setting unit by use of the terminal-side schedule; and an apparatus state reflection unit configured to output to the control device a control request to cause the control device to control the plurality of apparatuses such that the plurality of apparatuses are operated in the operating states simulated by the simulation unit.

A program according to the present invention is a program for causing a portable computer capable of communicating with a control device that controls operation of a plurality of apparatuses by communication in accordance with an external control request to function as: a terminal-side storage means configured to store a terminal-side schedule in which control contents are associated with control dates and times for each of the plurality of apparatuses; a date and time setting means configured to set an arbitrary date and time as a set date and time; a simulation means configured to simulate operating states of the plurality of apparatuses assuming that the plurality of apparatuses are operating at the set date and time set by the date and time setting means by use of the terminal-side schedule; and an apparatus state reflection means configured to output to the control device a control request to cause the control device to control the plurality of apparatuses such that the plurality of apparatuses are operated in the operating states simulated by the simulation means.

It is preferable that the program according to the present invention is stored in a computer readable storage medium.

With the present invention, operating states of a plurality of apparatuses are simulated by a mobile terminal assuming that the plurality of apparatuses are operating at a set date and time, and the actual apparatuses are controlled by a control device such that the plurality of apparatuses are in the simulated operating states. Thus, according to the present invention, operating states at the set date and time simulated by the mobile terminal can be easily confirmed on site.

BRIEF DESCRIPTION OF DRAWINGS

Preferred embodiments of the present invention will now be described in further detail. Other features and advantages of the present invention will be more fully understood, taken in conjunction with the following detailed description and attached drawings where.

BEST MODE FOR CARRYING OUT THE INVENTION

In the following First to Third Embodiments, an apparatus control system for controlling a plurality of apparatuses will be described.

(First Embodiment)

Figure 1:
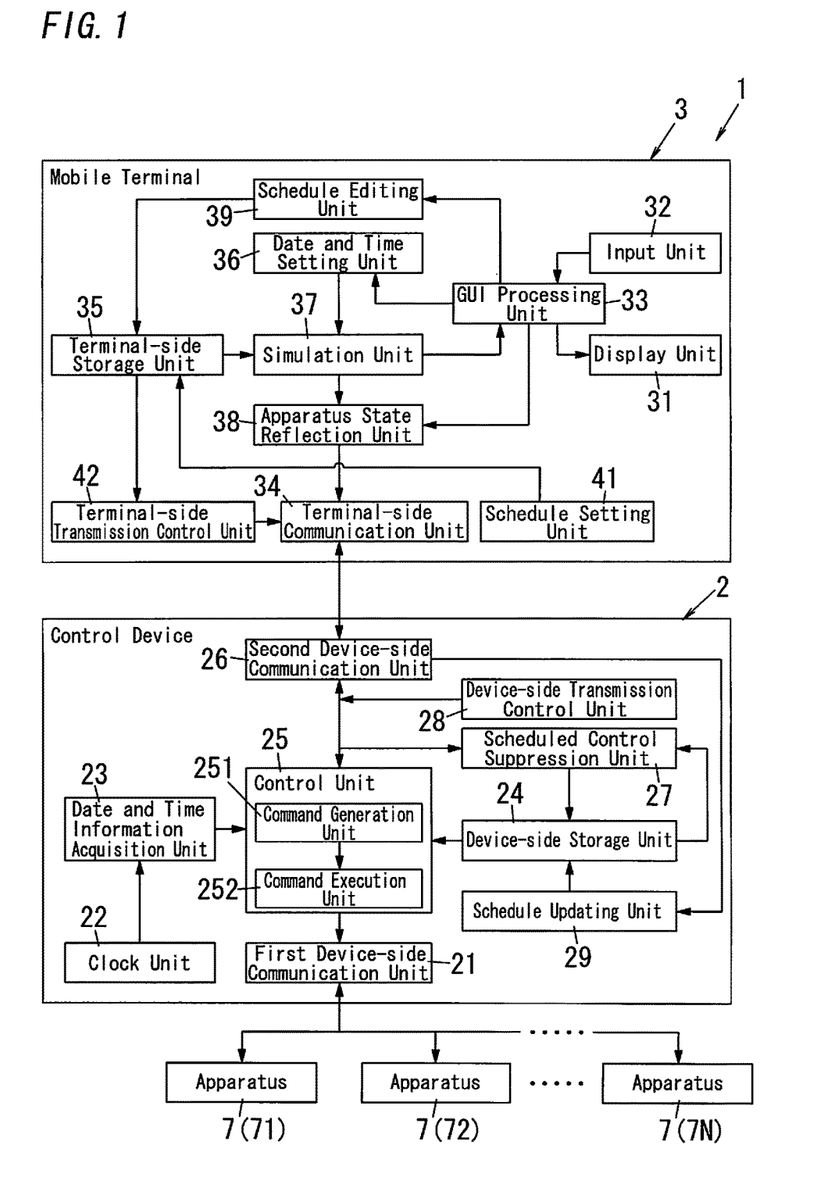
FIG. 1 is a block diagram illustrating a configuration of an apparatus control system according to First Embodiment.

An apparatus control system 1 according to First Embodiment includes, as shown in FIG. 1, a control device 2 that controls operation of a plurality of apparatuses 7(71), 7(72), . . . , 7(7N) by communication, and a portable mobile terminal 3 that is communicable with the control device 2. The apparatuses 7 are disposed in a predetermined area.

The area where the apparatuses 7 are disposed is a food supermarket or the like. However, the area where the apparatuses 7 are disposed is not limited to the above, and may be other places (e.g., private residence, office, etc.).

The apparatus 7 is an apparatus for controlling a lighting environment in the area, an air-conditioning environment in the area, or the like. That is to say, the apparatus 7 is, for example, a lighting apparatus for controlling the brightness in the area, an air-conditioning apparatus for controlling the temperature in the area, a freezing machine for frozen foods or the like, a refrigerating machine, or the like. The plurality of apparatuses 7(71), 7(72), . . . , 7(7N) may be a combination of different kinds (at least two of a lighting apparatus, an air-conditioning apparatus, a freezing machine, and a refrigerating machine, for example), or may be of the same kind (one of lighting apparatuses, air-conditioning apparatuses, freezing machines, and refrigerating machines, for example).

Next, the mobile terminal 3 will be described. The mobile terminal 3 is a portable terminal such as a tablet personal computer, and a CPU (Central Processing Unit) and a memory are mounted thereon. The mobile terminal 3 includes a display unit 31, an input unit 32, a GUI processing unit 33, a terminal-side communication unit 34, a terminal-side storage unit 35, a date and time setting unit 36, a simulation unit 37, and an apparatus state reflection unit 38.

The input unit 32 is activated when a user inputs information to the mobile terminal 3 by a GUI (Graphical User Interface). Operation information is input to the input unit 32 through a touch panel.

The GUI processing unit 33 executes various kinds of processing relating to the display unit 31 and the input unit 32. When a user performs an operation by the GUI provided in the mobile terminal 3, the GUI processing unit 33 determines the operation content.

The terminal-side communication unit 34 is a communication interface for communication between the control device 2 and the mobile terminal 3, and exchanges information with the control device 2. The communication between the control device 2 and the mobile terminal 3 may be IP communication using a wired LAN (Local Area Network), a wireless LAN or the like, or communication using a dedicated line such that the mobile terminal 3 is directly installed to the control device 2.

The terminal-side storage unit 35 stores a terminal-side schedule in which control contents of each of the apparatuses 7 are associated with control dates and times.

The date and time setting unit 36 sets, when an arbitrary date and time is input to the input unit 32, the date and time input to the input unit 32 as a set date and time.

The simulation unit 37 refers to the set date and time set by the date and time setting unit 36, and extracts control contents corresponding to the set date and time from the terminal-side schedule in the terminal-side storage unit 35. The simulation unit 37 that has extracted the control contents simulates operating states of respective apparatus 7 using the above control contents.

The simulation unit 37 outputs information relating to the simulated operating states to the GUI processing unit 33. The GUI processing unit 33 generates a display screen to be displayed on the display unit 31, based on the information input from the simulation unit 37.

The display unit 31 is, for example, a liquid crystal display, an organic EL (Electro-Luminescence) display, or the like, and displays the operating states simulated by the simulation unit 37. That is to say, the simulated operating state of each apparatus 7 at the above set date and time is displayed on the display unit 31.

Figure 2:
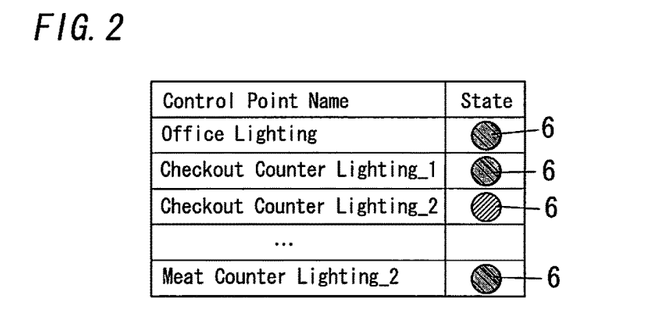
FIG. 2 is a diagram illustrating a display screen of a mobile terminal according to the First Embodiment.

The display unit 31 displays, as shown in FIG. 2, the operating state generated by the simulation unit 37 for each apparatus 7 by an icon 6. A display form of the icon 6 differs depending on the operating state. The display form of each icon 6 may be set such that each of the operating states is associated with a specific color, shape, or the like. Thus, a user seeing the icon 6 can be aware of the operating state.

Note that, although the mobile terminal 3 preferably includes the display unit 31, the mobile terminal 3 does not necessarily need to include the display unit 31. For example, the mobile terminal 3 may include a display-communication unit (not shown) for outputting display information to an external display apparatus (such as a portable display; not shown).

The apparatus state reflection unit 38 shown in FIG. 1 generates a control request when an operating state is simulated by the simulation unit 37. The control request is a request that causes (the control device 2) to control the apparatuses 7 such that the apparatuses 7 are operated in the respective operating states simulated by the simulation unit 37. The apparatus state reflection unit 38 that has generated a control request outputs the control request to the control device 2 through the terminal-side communication unit 34.

The apparatus state reflection unit 38 may be configured to generate a control request in response to input through the input unit 32, for example. When operation information is input by a user to the input unit 32 that causes the operating states simulated by the simulation unit 37 to be reflected in the respective apparatuses 7, for example, the GUI processing unit 33 instructs the apparatus state reflection unit 38 to generate a control request. Upon receiving the instruction, the apparatus state reflection unit 38 generates the control request. The apparatus state reflection unit 38 that has generated the control request outputs the control request to the control device 2.

Next, the control device 2 will be described. The control device 2 has a computer on which a CPU and a memory are mounted as the main constituent elements. The control device 2 instructs operation of the apparatuses 7, and collects information relating to the operating states of the apparatuses 7. The control device 2 includes a first device-side communication unit 21, a clock unit 22, a date and time information acquisition unit 23, a device-side storage unit 24, a control unit 25, a second device-side communication unit 26, and a scheduled control suppression unit 27. The control device 2 is installed in a different place from the area where the apparatuses 7 are disposed.

The first device-side communication unit 21 is a communication interface for the control device 2 to communicate with each of the apparatuses 7. The communication between the control device 2 and each of the apparatuses 7 may be based on time division multiplex transmission, and may be wired communication such as Ethernet, or RS-232C, or wireless communication such as ZigBee.

The second device-side communication unit 26 is a communication interface for the control device 2 to communicate with the mobile terminal 3, and exchanges information with the mobile terminal 3.

The date and time information acquisition unit 23 acquires (from the clock unit 22) date and time information relating to the current date and time. The clock unit 22 is a real time clock (RTC) or the like, and clocks the current date and time. The current date and time that the clock unit 22 clocks is a combination of a date (year/month/date) and a time (hour/minute/second). Note that the clock unit 22 does not necessarily need to be included in the control device 2. The date and time information acquisition unit 23 may acquire date and time information from an external apparatus.

The device-side storage unit 24 stores a control schedule in which control contents are associated with control dates and times for each apparatus 7.

The control unit 25 includes a command generation unit 251 and a command execution unit 252, and controls each apparatus 7 in accordance with the control schedule. Moreover, the control unit 25 has a function (interrupt control function) that controls each apparatus 7 in accordance with a control request from the mobile terminal 3. When the control request is sent from the mobile terminal 3, the control unit 25 prioritizes the control request from the mobile terminal 3 over the control schedule to control each apparatus 7. In this case, the control unit 25 performs so-called interrupt control.

That is to say, the control unit 25 controls each apparatus 7 in accordance with the control schedule, and, upon receiving a control request from the mobile terminal 3, controls each apparatus 7 with priority given to the control request over the control schedule.

In case of performing control in accordance with the control schedule, the command generation unit 251 periodically refers to the date and time information acquired by the date and time information acquisition unit 23. When the current date and time indicated by the date and time information coincides with a control date and time of the control schedule, the command generation unit 251 generates a control command for a control-targeted apparatus 7.

On the other hand, in case of performing control in accordance with the control request from the mobile terminal 3, the command generation unit 251 generates a control command for a control-targeted apparatus 7 in accordance with the control request.

When a control command is generated by the command generation unit 251, the command execution unit 252 executes the control command to control the control-targeted apparatus 7. Note that, once a control command (first control command) is generated by the command generation unit 251, the command execution unit 252 may execute the first control command to control the apparatus 7 until a new control command (second control command) is generated.

When the control request is output by the mobile terminal 3 to the control device 2, the scheduled control suppression unit 27 disables "control of each apparatus 7 in accordance with the control schedule performed by the control unit 25".

Incidentally, the mobile terminal 3 includes a schedule editing unit 39 to edit the contents of the terminal-side schedule.

When a user inputs change information to the input unit 32 for changing information of terminal-side schedule, the GUI processing unit 33 outputs a schedule change request to the schedule editing unit 39. Each of the change information and the schedule change request includes information relating to, for example, "a date and time targeted for schedule change", "an apparatus 7 targeted for schedule change", and "a content of schedule change". Upon receiving the schedule change request from the GUI processing unit 33, the schedule editing unit 39 changes the information of terminal-side schedule stored in the terminal-side storage unit 35. Note that the schedule change request may be created by the GUI processing unit 33, or by a unit other than the GUI processing unit 33 (processing unit provided separately from the GUI processing unit 33, for example).

Note that the GUI processing unit 33 may be configured to output "a set date and time set by the date and time setting unit (that is, the date and time of operating states currently being displayed on the display unit 31)" as the "date and time targeted for schedule change".

Incidentally, the control device 2 includes a device-side transmission control unit 28 that transmits information of control schedule to the mobile terminal 3, and the mobile terminal 3 includes a schedule setting unit 41 that sets the information of control schedule sent from the control device 2 into the terminal-side schedule. When the schedule setting unit 41 receives the information of control schedule which is transmitted from the control device 2 through the terminal-side communication unit 34, the schedule setting unit 41 updates the information the terminal-side schedule in the terminal-side storage unit 35 by the information control schedule.

The device-side transmission control unit 28, for example, may be configured to transmit the information of control schedule in response to input through the input unit 32 of the mobile terminal 3. That is to say, the apparatus control system 1 (control device 2 and mobile terminal 3) may be configured to set the information of control schedule into the terminal-side schedule in response to input through the input unit 32 of the mobile terminal 3. When a user inputs operation information to the input unit 32 to set the information of control schedule into the terminal-side schedule, for example, the GUI processing unit 33 outputs a schedule setting request through the terminal-side communication unit 34. The schedule setting request is a request to set the information of control schedule into the terminal-side schedule. When the device-side transmission control unit 28 receives the schedule setting request through the second device-side communication unit 26, the device-side transmission control unit 28 transmits the information of control schedule stored in the device-side storage unit 24 through the second device-side communication unit 26. Upon receiving the information of control schedule through the terminal-side communication unit 34, the schedule setting unit 41 updates the terminal-side schedule in the terminal-side storage unit 35 by the received control schedule.

Alternatively, the device-side transmission control unit 28 may be configured to transmit the information of control schedule in response to input from a control device side-input unit (not shown) connected to the control device 2.

Moreover, the mobile terminal 3 includes a terminal-side transmission control unit 42 that transmits contents of the terminal-side schedule to the control device 2, and the control device 2 includes a schedule updating unit 29 that changes contents of the control schedule to the contents of the terminal-side schedule transmitted from the mobile terminal 3. In the mobile terminal 3, after simulation performed by the simulation unit 37, the terminal-side transmission control unit 42 transfers the information of terminal-side schedule through the terminal-side communication unit 34 in order to reflect the information of terminal-side schedule in the control device 2. Upon receiving the information of terminal-side schedule through the second device-side communication unit 26, the schedule updating unit 29 of the control device 2 updates the information of control schedule in the device-side storage unit 24 by the information of terminal-side schedule.

For example, the terminal-side transmission control unit 42 may be configured to transfer the information of terminal-side schedule in response to input through the input unit 32. That is to say, the apparatus control system 1 (control device 2 and mobile terminal 3) may be configured to update the control schedule by the information of terminal-side schedule in response to input through the input unit 32 of the mobile terminal 3. For example, when a user inputs to the input unit 32 operation information intended to update the control schedule by the information of terminal-side schedule, the GUI processing unit 33 outputs a schedule updating request to the terminal-side transmission control unit 42. The schedule updating request is a request to update the control schedule by the information of terminal-side schedule. Upon receiving the schedule updating request from the GUI processing unit 33, the terminal-side transmission control unit 42 transfers the information of terminal-side schedule to the control device 2 through the terminal-side communication unit 34. Upon receiving the information of terminal-side schedule through the second device-side communication unit 26, the schedule updating unit 29 updates the control schedule in the device-side storage unit 24 by the information of terminal-side schedule.

Note that programs for the control device 2 to execute various functions are stored in the device-side storage unit 24 of the control device 2. That is to say, programs for causing the control device (computer) 2 to function as the first device-side communication unit 21, the clock unit 22, the date and time information acquisition unit 23, the device-side storage unit 24, the control unit 25, and the second device-side communication unit 26 are stored in the device-side storage unit 24. Moreover, programs for causing the control device 2 to function as the scheduled control suppression unit 27, the device-side transmission control unit 28, and the schedule updating unit 29 are stored in the device-side storage unit 24.

The above programs are pre-stored in the device-side storage unit 24 before shipping the control device 2. However, the above programs may be loaded into the device-side storage unit 24 after shipment of the control device 2. In a case where the above programs are loaded into the control device 2 after shipment, examples of method for loading the above programs to the control device 2 include a method to use a computer-readable recording medium in which the above programs are recorded. The recording medium is a memory card, a CD-ROM, a DVD-ROM, or the like. For using a recording medium, the control device 2 is required to be provided with at least a drive device (not shown) to read data recorded in the recording medium. The examples also include a method to download the above programs from a server through a network. For downloading the above programs through the network, the control device 2 is required to have at least a communication function (not shown) for communicating with the server through the network.

Moreover, programs for the mobile terminal 3 to execute various functions are stored in the terminal-side storage unit 35 of the mobile terminal 3. That is to say, programs for causing the mobile terminal (computer) 3 to function as the display unit 31, the input unit 32, the GUI processing unit 33, the terminal-side communication unit 34, the terminal-side storage unit 35, the date and time setting unit 36, the simulation unit 37, and the apparatus state reflection unit 38 are stored in the terminal-side storage unit 35. Further, programs for causing the mobile terminal 3 to function as the schedule editing unit 39, the schedule setting unit 41, and the terminal-side transmission control unit 42 are stored in the terminal-side storage unit 35.

The above programs are pre-stored in the terminal-side storage unit 35 before shipping the mobile terminal 3. However, the above programs may be loaded into the terminal-side storage unit 35 after shipment of the mobile terminal 3. In a case where the above programs are loaded into the mobile terminal 3 after shipment, examples of method for loading the above programs to the mobile terminal 3 include a method to use a computer-readable recording medium in which the above programs are recorded. The recording medium is a memory card, a CD-ROM, a DVD-ROM, or the like. For using a recording medium, the mobile terminal 3 is required to be provided with at least a drive device (not shown) to read data recorded in the recording medium. The examples also include a method to download the above programs through a server using a network. For downloading the above programs through the network, the mobile terminal 3 is required to have at least a communication function (not shown) for communicating with the server through the network.

As described above, with the apparatus control system 1 according to the present embodiment, operating states of the apparatuses 7 at a set date and time are simulated in the mobile terminal 3, and the control device 2 controls the actual apparatuses 7 so as to be in the simulated operating states. Thus, in the present embodiment, a user can easily confirm the operating states simulated in the mobile terminal 3 on site. As a result, a control schedule used for actual control can be adjusted optimally in a short time.

According to the present embodiment, due to the apparatuses 7 being disposed in a predetermined area, a user can grasp the operating states of the apparatuses 7 in the area while confirming the on-site situation. Thus, the terminal-side schedule, for example, can be easily adjusted.

With the apparatus control system 1 according to the present embodiment, when the operating states simulated by the mobile terminal 3 are actually confirmed, control in accordance with the control schedule of the control device 2 is disabled. Thus, in the present embodiment, the operating state simulated by the mobile terminal 3 can be evaluated in a stable state.

According to the present embodiment, since a user can input information through the input unit 32 of the mobile terminal 3, the user can edit the terminal-side schedule on the mobile terminal 3.

Moreover, with the apparatus control system 1 according to the present embodiment, as a result of the display unit 31 displaying the operating states of the apparatuses 7 by the respective icons 6, a user can view all the operating states of a plurality of the apparatuses 7(71), 7(72), . . . , 7(7N) at the same time. Accordingly, when controlling a plurality of lighting apparatuses, for example, the user can control the plurality of lighting apparatuses so as to perform partial operation for energy saving while taking the operating states of the adjacent lighting apparatuses into consideration.

With the apparatus control system 1 according to the present embodiment, the information of terminal-side schedule is transmitted from the mobile terminal 3 to the control device 2, and the information of control schedule is changed to the information of terminal-side schedule. Thus, in the present embodiment, the information of terminal-side schedule can be reflected in the control schedule used for the actual apparatus control.

Moreover, with the apparatus control system 1 according to the present embodiment, the information of control schedule is transmitted from the control device 2 to the mobile terminal 3, and the information of control schedule is set into the terminal-side schedule. Thus, in the present embodiment, the information of terminal-side schedule can be set based on the information of control schedule used for the actual apparatus control.

Figure 3:
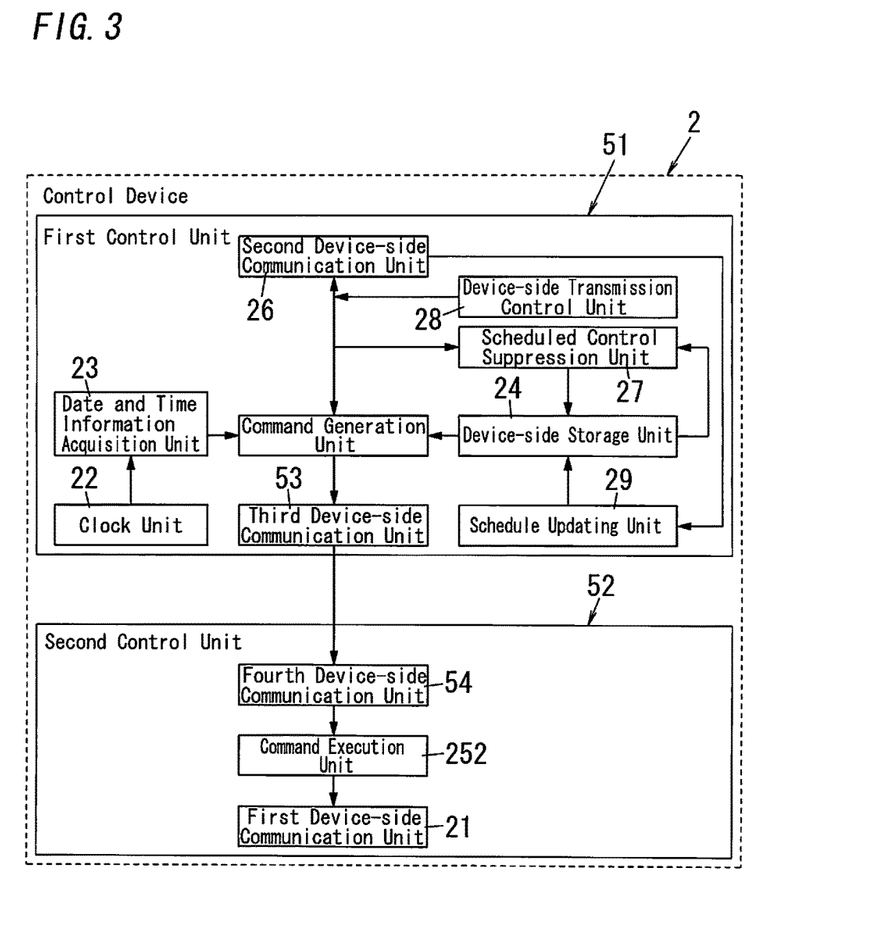
FIG. 3 is a block diagram illustrating a configuration of a control device according to a variation of the First Embodiment.

Note that, the control device 2 need not to be one unit and may be configured by a plurality of units as shown in FIG. 3. The control device 2 shown in FIG. 3 is configured by a first control unit 51 and a second control unit 52. The communication between the first control unit 51 and the second control unit 52 is performed through a third device-side communication unit 53 and a fourth device-side communication unit 54.

Moreover, the control device 2 may generate, upon receiving a control request from the mobile terminal 3, a schedule disabling request internally, and the control schedule may be disabled by the scheduled control suppression unit 27.

Further, in the control device 2, the command generation unit 251 and the scheduled control suppression unit 27 may be configured by the same block.

Alternatively, the apparatus state reflection unit 38 of the mobile terminal 3 may transmit a request to disable the control schedule (schedule disabling request) together with the control request. Upon receiving the schedule disabling request, the scheduled control suppression unit 27 disables "the control of each apparatus 7 in accordance with the control schedule by the control unit 25".

Note that, in the mobile terminal 3, the schedule setting unit 41 may be included in the schedule editing unit 39, and the schedule editing unit 39 may update the terminal-side schedule by interpreting the information of control schedule sent from the control device 2.

(Second Embodiment)

Figure 4:
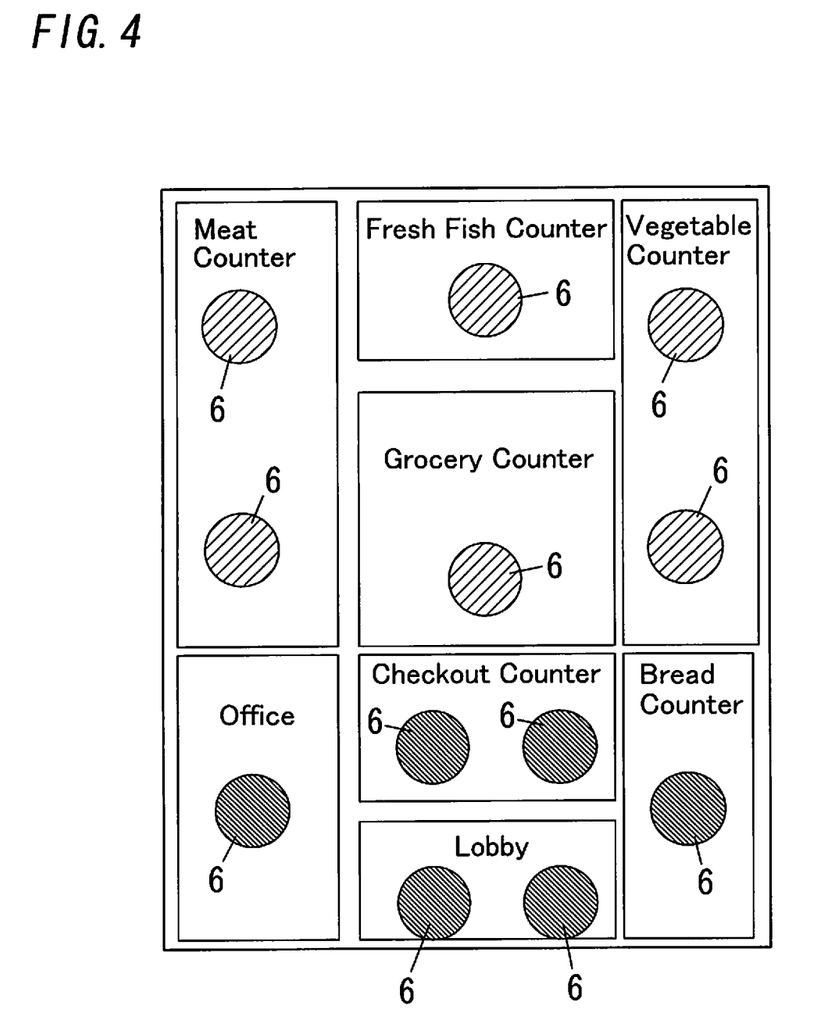
FIG. 4 is a diagram illustrating a display screen of a mobile terminal according to Second Embodiment.

An apparatus control system 1 according to Second Embodiment is different from the apparatus control system 1 according to the First Embodiment in that a display unit 31 displays icons 6 that represent respective operating states in a superimposed manner on a map, as shown in FIG. 4. Note that constituent elements similar to the apparatus control system 1 of the First Embodiment are given the same reference signs, and redundant description thereof will be omitted.

A terminal-side storage unit 35 of the present embodiment further stores map information and location information of each apparatus 7. Examples of method to input the location information to a mobile terminal 3 include a method to input by automatically detecting the location using GPS(Global Positioning System) or the like, and a method in which a user inputs information manually. Note that description of functions similar to the terminal-side storage unit 35 of the First Embodiment will be omitted.

A GUI processing unit 33 of the present embodiment controls the display unit 31 such that the icons 6 that represent the operating states of the respective apparatuses 7 are displayed in a superimposed manner on the map by use of the map information in the terminal-side storage unit 35. Note that description of functions similar to the GUI processing unit 33 of the First Embodiment will be omitted.

The display unit 31 of the present embodiment displays the icons 6 in a superimposed manner on the map in which the locations of the respective apparatuses 7 are indicated, as shown in FIG. 4, in accordance with the control of the GUI processing unit 33. The display form of the icon 6 differs according to the operating state. The icon 6 may differ, for example, in color or shape according to the operating state. Thus, a user who views the icon 6 can be aware of the operating state. Note that description of functions similar to the display unit 31 of the First Embodiment will be omitted.

Incidentally, with an input unit 32 of the present embodiment, an icon 6 displayed on the display unit 31 is selected, and information to change the control content of the apparatus 7 corresponding to the icon 6 is input. In other words, the mobile terminal 3 of the present embodiment is configured such that an icon 6 displayed on the display unit 31 is selected through the input unit 32, and change information for the apparatus 7 corresponding to the icon 6 is input through the input unit 32. Note that description of functions similar to the input unit 32 of the First Embodiment will be omitted.

For example, the GUI processing unit 33 may be configured, in response to the selection of an icon 6, to change the display form (state) of the selected icon 6. The icon 6 may have 3 display forms or more. In this case, the GUI processing unit 33 may change the state of the icon 6 in a predetermined sequence based on the number of times the icon 6 is selected.

As a result of a user changing the state of the icon 6, the GUI processing unit 33 automatically determines to add or delete information to or from the terminal-side schedule (that is, changes the terminal-side schedule) based on the screen currently displayed and a change content. For example, the GUI processing unit 33 is configured to determine that a control content of the apparatus 7 corresponding to the icon 6 at the "set date and time set by date and time setting unit" is to be changed when the user changes the state of the icon 6. Having determined to add or delete information to or from the terminal-side schedule, the GUI processing unit 33 outputs an addition request or a deletion request for the terminal-side schedule to a schedule editing unit 39.

In accordance with the addition request or deletion request received from the GUI processing unit 33, the schedule editing unit 39 of the present embodiment changes a control content, which is in the terminal-side schedule stored in the terminal-side storage unit 35, of the apparatus 7 corresponding to the icon 6 selected with the input unit 32. Note that description of functions similar to the schedule editing unit 39 of the First Embodiment will be omitted.

Note that the above processing (processing for changing a control content of an apparatus 7 by selecting a corresponding icon 6) can be applied to the mobile terminal 3 of the First Embodiment.

As described above, the mobile terminal 3 of the present embodiment can display the locations of the respective apparatuses 7 in an easily understood manner by displaying the icons 6 that indicate the operating states at the set date and time in a superimposed manner at the locations of the respective apparatuses 7 on the map.

Moreover, according to the present embodiment, a user can change (add or delete) a control content associated with the set date and time simulated in the mobile terminal 3 while confirming the operating states of the respective apparatuses 7.

Note that the method may be that, in the mobile terminal 3, the simulation unit 37 instead of the GUI processing unit 33 acquires the map information in the terminal-side storage unit 35, and the simulation unit 37 generates display information including the operating states and the map information and then outputs the display information to the GUI processing unit 33.

(Third Embodiment)

In Third Embodiment, a case where group control is performed will be described. The group control is control in which at least two apparatuses 7 are set (referred to) as grouped apparatuses belonging to the same group, and the grouped apparatuses are caused to perform the same control contents. Note that constituent elements similar to the apparatus control system 1 of the Second Embodiment are given the same reference signs, and redundant description thereof will be omitted.

A terminal side storage unit 35 of the present embodiment stores the same control contents for at least two apparatuses 7 among the plurality of apparatuses 7(71), 7(72), ..., 7(7N) in the terminal-side schedule, with the at least two apparatuses referred to as grouped apparatuses. Specifically, the terminal side storage unit 35 of the present embodiment stores at least two apparatuses 7 among the plurality of apparatuses 7(71), 7(72), ..., 7(7N) as grouped apparatuses in the terminal-side schedule, and collectively stores the same control contents for all the apparatuses 7 of the grouped apparatuses. Note that description of functions similar to the terminal side storage unit 35 of the Second Embodiment will be omitted.

When an icon 6 corresponding to any of the apparatuses 7 of the grouped apparatuses is selected with an input unit 32, that is, in a case where the change target is any of the apparatuses 7 of the grouped apparatuses, a mobile terminal 3 of the present embodiment displays a warning message notifying that the remaining apparatuses 7 of the grouped apparatuses will be affected. The warning message may include information that which of apparatuses 7 will be affected. An operation for displaying the warning message will be described with reference to FIG. 5.

Figure 5:
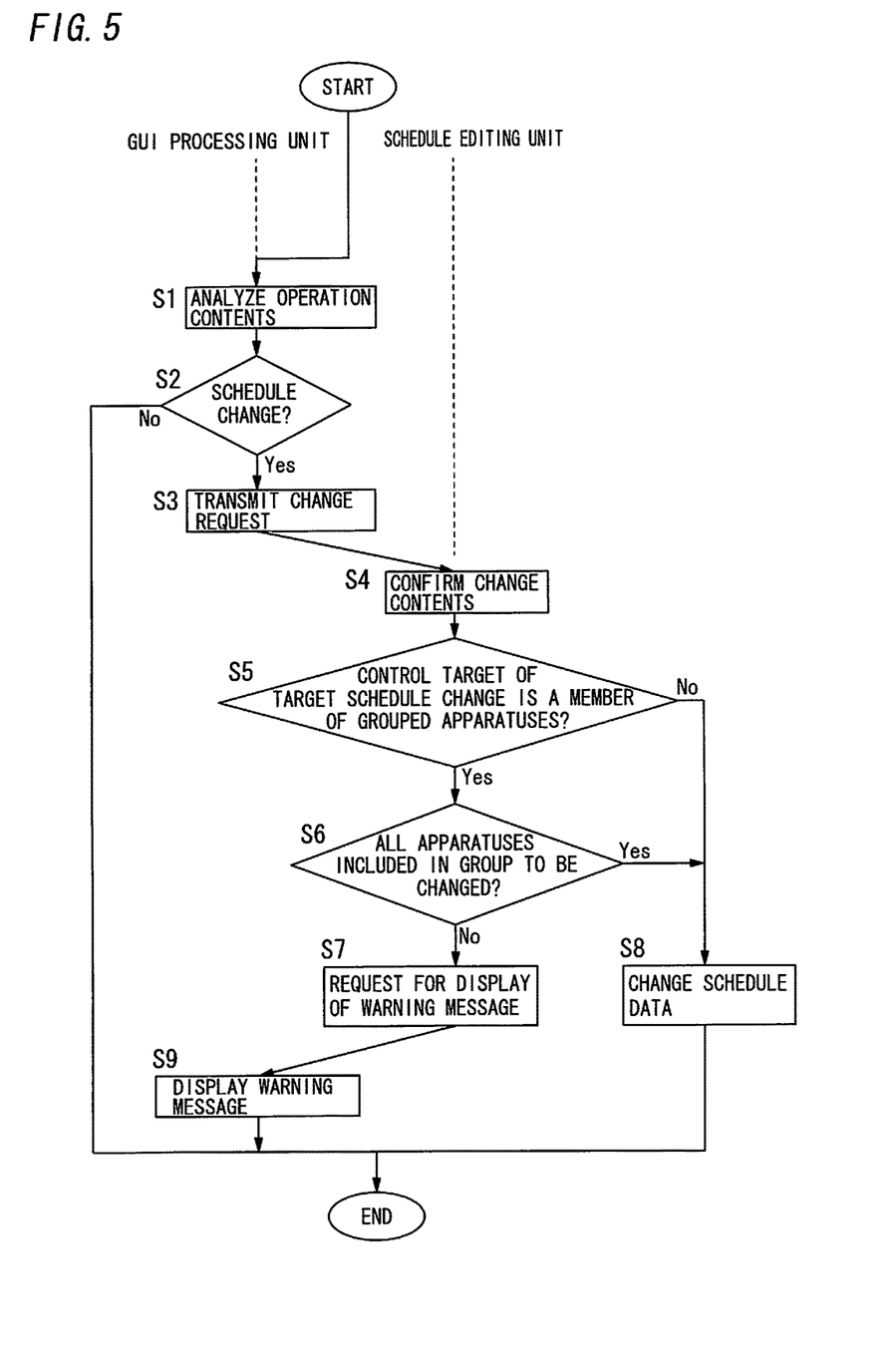
FIG. 5 is a flowchart illustrating an operation for displaying a warning message by an apparatus control system according to Third Embodiment.

First, a GUI processing unit 33 of the present embodiment analyzes an operation content (which is input to the input unit 32) (S1 in FIG. 5). In a case of not including any schedule change (in a case where the operation content does not include a content relating to a schedule change), the GUI processing unit 33 ends the operation for displaying the warning message. On the other hand, in a case of including a schedule change (S2), the GUI processing unit 33 outputs a change request to a schedule editing unit 39 (S3). Here, the change request includes information relating to "date and time targeted for schedule change", "apparatus 7 targeted for schedule change", and "change content of schedule", for example.

The schedule editing unit 39 of the present embodiment confirms the content of the change request, upon receiving the change request from the GUI processing unit 33 (S4). When the control target apparatus 7 in the change target schedule is a member of the grouped apparatuses (S5), the schedule editing unit 39 determines whether or not it is directed to change all the apparatuses 7 belonging to the same group (S6). When it is not directed that all the apparatuses 7 are to be changed (in a case where the change request is not for changing the schedules of all the apparatuses 7 belonging to the grouped apparatuses), the schedule editing unit 39 outputs a display request (S7) that causes the GUI processing unit 33 to display the warning message. On the other hand, if the control target apparatus 7 is not a member of the grouped apparatuses in step S5, the schedule editing unit 39 changes the information of terminal-side schedule. That is to say, the schedule editing unit 39 changes the schedule (S8) of the apparatus 7 designated by the change request in the terminal-side schedule. Moreover, it is intended that all the apparatuses 7 are to be changed in step S6, the schedule editing unit 39 changes the information of terminal-side schedule. That is to say, the schedule editing unit 39 collectively changes the schedules of all the apparatuses 7 designated by the change request in the terminal-side schedule (S8).

The GUI processing unit 33, upon receiving the display request from the schedule editing unit 39, controls the display unit 31 so as to cause the warning message to be displayed on a display screen (S9).

The display unit 31 of the present embodiment displays the warning message in accordance with the control by the GUI processing unit 33. The display unit 31 of the present embodiment has a function as an informing unit. Note that description of functions similar to the display unit 31 of the Second Embodiment will be omitted.

Incidentally, in a case of deleting a control content for any of the apparatuses 7 of the grouped apparatuses, if the same scheduled control as before is desired to be performed on the remaining apparatuses 7 of the grouped apparatuses, the schedule editing unit 39 deletes the change target apparatus 7 from the members of the grouped apparatuses. Furthermore, the schedule editing unit 39 re-registers the remaining apparatuses 7 of the grouped apparatuses as new grouped apparatuses.

Note that a configuration is possible in which the mobile terminal 3 holds both the group setting data before and after the change, and a control device 2 does not change the group setting data. That is to say, the mobile terminal 3 may hold the group setting data before the change (first group setting data) and the group setting data after the change (setting data for setting the remaining apparatuses, excluding the apparatus 7 designated as a change target from the grouped apparatuses of the first group setting data, as a group; second group setting data). Then, the mobile terminal 3 may change the group to be targeted for scheduled control from the first group setting data to the second group setting data.

Moreover, in a case where an existing group setting is not desired to be changed, it is possible to handle by adding a new group setting and setting the added group as the scheduled control target.

An operation in such a case described above will be described with reference to FIG. 6.

Figure 6:
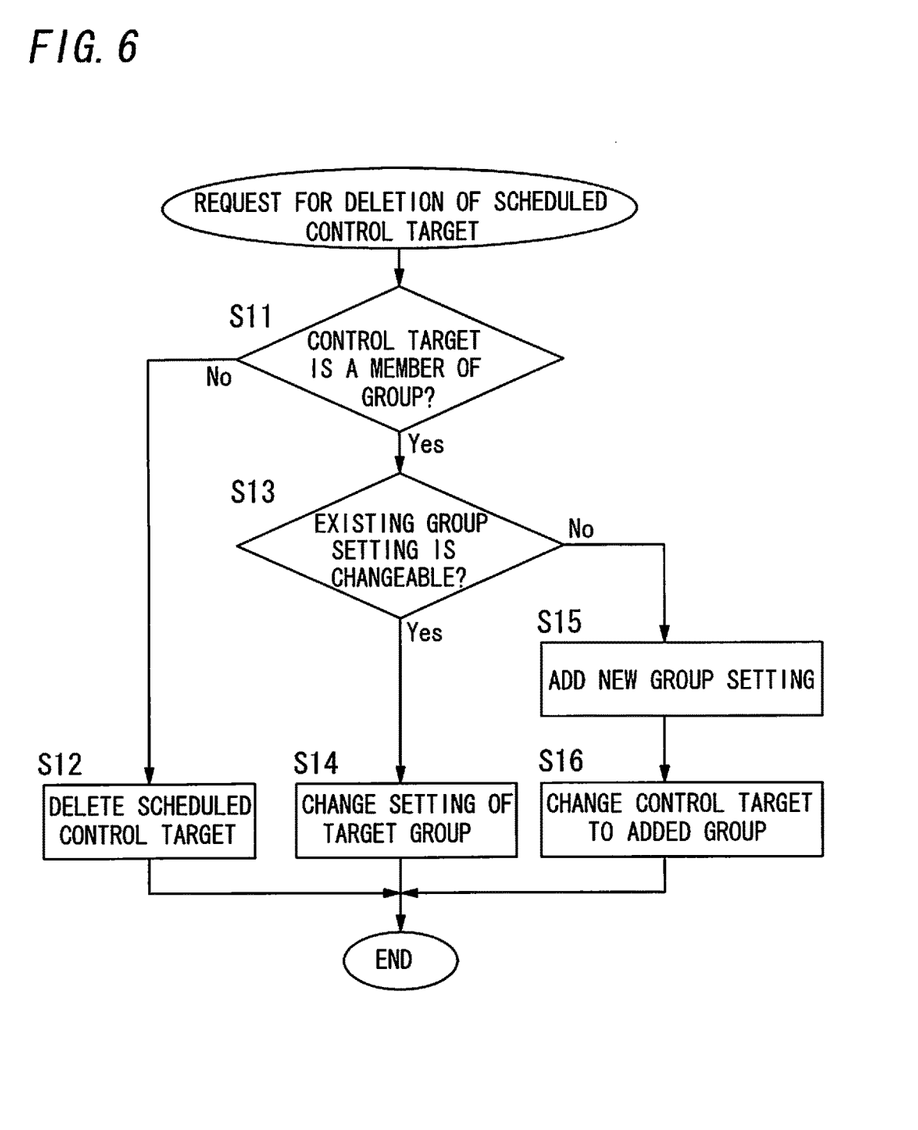
FIG. 6 is a flowchart illustrating an operation for editing a schedule by the apparatus control system according to the Third Embodiment.

First, it is judged whether or not the apparatus 7 identified as a deletion target is a member of grouped apparatuses (S11 in FIG. 6). If the deletion target apparatus 7 is not a member of grouped apparatuses, the schedule editing unit 39 deletes the deletion target apparatus 7 (S12).

On the other hand, when the deletion target apparatus 7 is a member of grouped apparatuses, it is determined whether or not it is possible to change the setting of the existing grouped apparatuses (S13). If the change is possible, the setting of the grouped apparatuses is changed (S14). On the other hand, if the change is not possible, it is added a setting of new grouped apparatuses (S15). After that, the control target is changed to the added group (S16).

Moreover, the schedule editing unit 39 of the present embodiment has a function, when at least two icons 6 are selected with the input unit 32, of adding the same control content for at least two apparatuses 7 corresponding to the at least two icons 6 selected with the input unit 32 to the terminal-side schedule. Specifically, the schedule editing unit 39 of the present embodiment sets, when at least two icons 6 are selected with the input unit 32, at least two apparatuses 7 corresponding to the at least two icons 6 selected with the input unit 32 as grouped apparatuses and then adds the same control content for the apparatuses 7 set as the grouped apparatuses to the terminal-side schedule.

As described above, according to the present embodiment, as a result of displaying a warning message by the display unit 31 of the mobile terminal 3, a user can avoid changing control contents of the other apparatuses 7 included in grouped apparatuses accidentally.

Moreover, according to the present embodiment, processing for excluding an apparatus 7 selected with the input unit 32 from grouped apparatuses can be performed smoothly.

Furthermore, according to the present embodiment, control contents of grouped apparatuses can be added smoothly.

Note that informing the warning message is not limited to display by the display unit 31, and may be a sound output such as a warning sound or voice.

Moreover, examples of method to designate a plurality of icons 6 on a map include a method of touching individual icons 6 and a method of performing an operation to enclose a plurality of icons 6. For example, as a result of a user selecting a plurality of icons 6 on a map in a predetermined period of time, all the apparatuses 7 corresponding to the selected icons 6 can be set as grouped apparatuses. Similarly, for icons 6 included in a region enclosed by a drag operation, all the corresponding apparatuses 7 can be set as grouped apparatuses.

The invention claimed is:

1. An apparatus control system for controlling a plurality of apparatuses located in a predetermined area, comprising:
   a control device installed in a place different from the predetermined area and configured to control operation of each of the plurality of apparatuses by communication; and
   a portable mobile terminal configured to communicate with the control device, wherein the control device includes:
   a device-side storage unit configured to store a control schedule in which control contents are associated with control dates and times for each of the plurality of apparatuses; and
   a control unit configured to control the plurality of apparatuses in accordance with the control schedule and, when a control request is received from the portable mobile terminal, in accordance with the control request from the portable mobile terminal, and
   wherein the portable mobile terminal includes:
   a terminal-side storage unit configured to store a terminal-side schedule in which control contents are associated with control dates and times for each of the plurality of apparatus;
   a date and time setting unit configured to set an arbitrary date and time as an arbitarily set date and time;
   a simulation unit configured to simulate operating states of the plurality of apparatuses, the simulated operating states being states in which the plurality of apparatuses operate at the arbitrarily set date and time, using the terminal-side schedule;
   a display unit configured to display the operating state at the arbitrarily set date and time simulated by the simulation unit, and
   an apparatus state reflection unit configured to generate the control request in relation to the simulated operating states, and to output the control request to the control device to cause the control device to control the plurality of apparatuses to operate in the simulated operating states rather than in their operation states according to the control schedule.

2. The apparatus control system according to claim 1, wherein the control device includes a scheduled control suppression unit configured to disable control in accordance with the control schedule by the control unit, when the control request is output from the apparatus state reflection unit to the control device.

3. The apparatus control system according to claim 1, wherein the portable mobile terminal includes:
   an input unit configured to receive input of change information by a GUI, the change information being information for changing the terminal-side schedule; and
   a schedule editing unit configured to edit the terminal-side schedule using the change information input to the input unit.

4. The apparatus control system according to claim 3, wherein the display unit is configured to display the operating state simulated by the simulation unit for each of the plurality of apparatuses by an icon.

5. The apparatus control system according to claim 4, wherein the display unit is configured to display, for each of the plurality of apparatuses, the icon in a superimposed manner on a map on which a location of the apparatus is indicated.

6. The apparatus control system according to claim 4, wherein the input unit is configured to allow selection of the icon displayed on the display unit and to allow to receive the change information for the apparatus corresponding to the selected icon through the display unit, and
   the schedule editing unit changes a control content of the terminal-side schedule for the apparatus corresponding to the icon selected with the input unit.

7. The apparatus control system according to claim 6, wherein the terminal-side storage unit stores the same control contents for at least two apparatuses among the plurality of apparatuses in the terminal-side schedule, with the at least two apparatuses referred to as grouped apparatuses, and
   the portable mobile terminal includes an informing unit configured to inform that the remainder of the grouped apparatuses will be affected, when the icon corresponding to any of apparatuses in the grouped apparatuses is selected with the input unit and a control content of the grouped apparatuses is to be deleted from the terminal-side schedule by the schedule editing unit.

8. The apparatus control system according to claim 6, wherein the terminal-side storage unit stores the same control contents for at least two apparatuses among the plurality of apparatuses in the terminal-side schedule, with the at least two apparatuses referred to as grouped apparatuses, and
   the schedule editing unit causes, when the icon corresponding to any of apparatuses in the grouped apparatuses is selected with the input unit and a control content of the apparatus corresponding to the icon is to be deleted from the terminal-side schedule, remainder of the grouped apparatuses to be referred to as new grouped apparatuses.

9. The apparatus control system according to claim 6, wherein the schedule editing unit adds to the terminal-side schedule, when at least two of the icons are selected with the input unit, the same control content for at least two apparatuses corresponding to the at least two icons selected with the input unit.

10. The apparatus control system according to claim 1, wherein the portable mobile terminal includes a terminal-side transmission control unit configured to transmit information of the terminal-side schedule to the control device, and
the control device includes a schedule updating unit configured to change information of the control schedule to the information of the terminal-side schedule transmitted from the portable mobile terminal.

11. The apparatus control system according to claim 1, wherein the control device includes a device-side transmission control unit configured to transmit information of the control schedule to the portable mobile terminal, and
the portable mobile terminal includes a schedule setting unit configured to set the information of the control schedule transmitted from the control device into the terminal-side schedule.

12. The apparatus control system according to claim 3, wherein the input unit is configured to be input operation information for changing the control schedule by the GUI,
the portable mobile terminal includes a terminal-side transmission control unit configured to transmit information of the terminal-side schedule to the control device in response to input through the input unit, and
the control device includes a schedule updating unit configured to change information of the control schedule to the information of the terminal-side schedule transmitted from the portable mobile terminal.

13. A portable mobile terminal, capable of communicating with a control device that controls operation of a plurality of apparatuses by communication in accordance with an external control request, the plurality of apparatus being located in a predetermined area, the control device being installed in a place different from the predetermined area, the portable mobile terminal comprising:
a terminal-side storage unit configured to store a terminal-side schedule in which control contents are associated with control dates and times for each of the plurality of apparatuses;
a date and time setting unit configured to set an arbitrary date and time as an arbitrily set date and time;
a simulation unit configured to simulate operating states of the plurality of apparatuses, the simulated operating states being states in which the plurality of apparatuses operate at the arbitrarily set date and time, using the terminal-side schedule;
a display unit configured to display the operating state at the arbitrarily set date and time simulation by the simulation unit; and
an apparatus state reflection unit configured to generate the control request in relation to the simulated operating states, and to output the control request to the control device to cause the control device to control the plurality of apparatuses to operate in the simulated operating states rather than in their operation states according to the control schedule.

14. A non-transitory computer readable medium having stored thereon a program to be executed by a portable computer capable of communicating with a control device that controls operation of a plurality of apparatuses by communication in accordance with an external control request, the plurality of
apparatus being located in a predetermined area, the control device being installed in a place different from the predetermined area, the program when executed by the portable compute, to perform:
storing a terminal-side schedule in which control contents are associated with control dates and times for each of the plurality of apparatuses;
setting an arbitrary date and time as an arbitrarily set date and time;
simulating operating states of the plurality of apparatuses, the simulated operating states being states in which the plurality of apparatuses operate at the arbitrarily set date and time, using the terminal-side schedule;
displaying the operating states at the arbitrarily set date and time simulated;
generating the control request in relation to the simulated operating states; and
outputting the control request to the control device to cause the control device to control the plurality of apparatuses to operate in the simulated operating states rather than in their operation states according to the control schedule.

* * * * *